W. J. SWARTZ.
CONFECTION.
APPLICATION FILED JAN. 20, 1913.

1,087,335.

Patented Feb. 17, 1914.

Witnesses
James E. Sproll.
Clara A. Harm.

Inventor
William J. Swartz.
By
Adams & Brooks
Attorneys

UNITED STATES PATENT OFFICE.

WILLIAM J. SWARTZ, OF SEATTLE, WASHINGTON, ASSIGNOR TO AUTOMATIC CANDY MACHINE COMPANY, OF SEATTLE, WASHINGTON, A CORPORATION OF WASHINGTON.

CONFECTION.

1,087,335.  Specification of Letters Patent.  Patented Feb. 17, 1914.

Application filed January 20, 1913. Serial No. 743,112.

*To all whom it may concern:*

Be it known that I, WILLIAM J. SWARTZ, a citizen of the United States of America, and a resident of the city of Seattle, in the county of King and State of Washington, have invented certain new and useful Improvements in Confections, of which the following is a specification.

My invention has particular reference to candies which unless packed in individual wrappers or otherwise held so that a too great a portion of one candy will not directly abut or bear on another, soon become what is commonly known as "sweaty," a collecting of moisture on their outer surfaces through capillary action.

It is therefore a fundamental object of my invention to overcome this objectionable feature, and I do this in a simple and efficient manner, which will not add to the cost of production of the articles, or to the packing thereof in the boxes in which they are shipped or placed on the market. I accomplish this by forming one side face, or that face of a candy, normally directly facing or abutting another candy, with one or more grooves or channels, which in combination with the adjacent face of the said other candy form one or a plurality of through passages for the free circulation of air between the candies.

In the accompanying drawing, I have shown candies of disk-like form provided with grooves in two arrangements.

Figure 1:
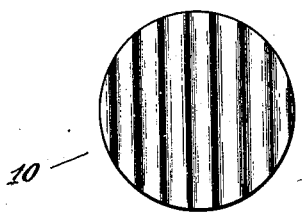
Figure 4:
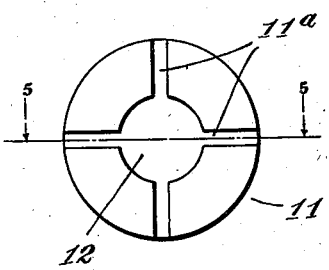
Figure 2:
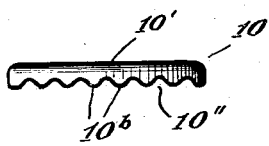
Figure 3:
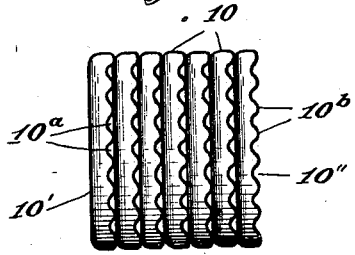

In said drawings Figure 1 is a bottom plan of a candy. Fig. 2 is an edge view thereof. Fig. 3 is an edge view of a plurality of candies arranged in a row, as when packed. Fig. 4 is a bottom plan of a candy with the circulating grooves in modified arrangement, and Fig. 5 is a cross-section on line 5—5 of Fig. 4.

Referring to the drawing by numerals of reference, 10 indicates the body of the candy which can be composed of any suitable ingredients. It is shown as being in the form of a wafer or disk-like having one flat face 10' and a corrugated opposite face 10''.

In packing a number of the bodies 10, as shown in Fig. 3, the corrugated face 10'' of one body opposes and abuts or bears against face 10' of an adjacent candy thereby providing a plurality of passages $10^a$ for the air, the said passages extending entirely across the bodies. Further, by corrugating bodies 10, only the narrow ribs $10^b$ come in contact with the adjacent bodies, and therefore danger of one candy adhering to another is reduced to a minimum.

Figure 5:
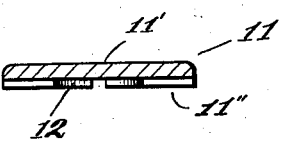

In the construction shown in Figs. 4 and 5 the candy bodies 11 have a flat face 11', and the opposite face 11'' is formed with a central annular space or chamber 12 with which radial grooves $11^a$, extending to the edge of the body communicate. In this construction, projecting parts on one body, due to the formation of the grooves can not project into recesses on the adjacent body, should the candies be improperly packed with their grooved faces facing one another.

I reserve the right to make alterations and changes in the air circulating passage provisions, as fall within the scope of my annexed claims.

Having thus described my invention what I claim as new, and desire to secure by Letters Patent of the United States of America, is:—

1. A disk like candy comprising a body having one side face flat and the other formed with a plurality of grooves extending across the same and adapted to form passages for the circulation of air when the said grooved surface portion of the candy is abutting an object.

2. A candy of disk form having one side face formed with a plurality of grooves extending to the edge of the candy and having their ends open, the other side face of the candy being flat, whereby when packed with similar candies its said flat side face will abut the grooved side face of an adjacent candy and provide in conjunction therewith passages for the circulation of air.

3. A candy formed on one side face with parallel narrow ribs forming grooves extending across the candy and having their ends open, the innermost ribs being the longest and those on either side of the latter gradually decreasing in length to the outermost ribs.

4. A candy formed on one side face with parallel narrow ribs forming grooves extending across the candy and having their ends open, the innermost ribs being the longest and those on either side of the latter gradually decreasing in length to the outermost ribs, the opposite side face of said candy being flat.

Signed at Seattle, Washington, this 23rd day of November 1912.

WILLIAM J. SWARTZ.

Witnesses:
STEPHEN A. BROOKS,
E. ARLITA ADAMS.